United States Patent

Kawarazaki et al.

[11] Patent Number: 5,982,985
[45] Date of Patent: *Nov. 9, 1999

[54] COMPUTER MONITORING UNIT AND POWER WINDOW SYSTEM

[75] Inventors: Yoshiharu Kawarazaki; Yasushi Nishibe; Hitoshi Iwata, all of Aichi-ken, Japan

[73] Assignee: Kabushiki Kaisha Tokai-Rika-Denki-Seisakusho, Aichi-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/915,670

[22] Filed: Aug. 21, 1997

[30] Foreign Application Priority Data

Aug. 30, 1996 [JP] Japan .................................. 8-231046
Aug. 19, 1997 [JP] Japan .................................. 9-222263

[51] Int. Cl.⁶ .................................. H02P 1/00; H02P 1/06
[52] U.S. Cl. .................................. 388/907.5; 388/907.05; 318/268
[58] Field of Search .................................. 318/268, 254, 318/565, 138, 439, 558, 611, 615, 616, 617, 624; 388/907.5

[56] References Cited

U.S. PATENT DOCUMENTS

| | | | |
|---|---|---|---|
| 4,347,465 | 8/1982 | Goertler et al. | 318/266 |
| 4,641,067 | 2/1987 | Iizawa et al. | 318/287 |
| 4,801,812 | 1/1989 | Brusasco | 307/10 |
| 5,298,840 | 3/1994 | Yoshino et al. | 318/268 |
| 5,585,705 | 12/1996 | Brieden | 318/467 |

*Primary Examiner*—Ayaz R. Sheikh
*Assistant Examiner*—Tim Vo
*Attorney, Agent, or Firm*—Sixbey Friedman Leedom & Ferguson; Thomas W. Cole

[57] ABSTRACT

The first circuit inputs a clock signal from MICON. The second circuit inputs a clock signal corresponding to the clock signal from the first circuit, and outputs a judgment signal continued for a specified time from the time when the clock signal is inputted. The judgment signal is inputted to the third circuit. A standby signal from MICON is inputted to the third circuit. When MICON is normal, the clock signal properly outputted, and to the AND circuit, the second signal is inputted, and if the standby signal is inputted from MICON with the second signal inputted, it can be judged that the standby signal is properly outputted from the normal MICON. Consequently, when both judgment signal and standby signal are inputted, the third circuit outputs the standby active signal to the first circuit.

19 Claims, 3 Drawing Sheets

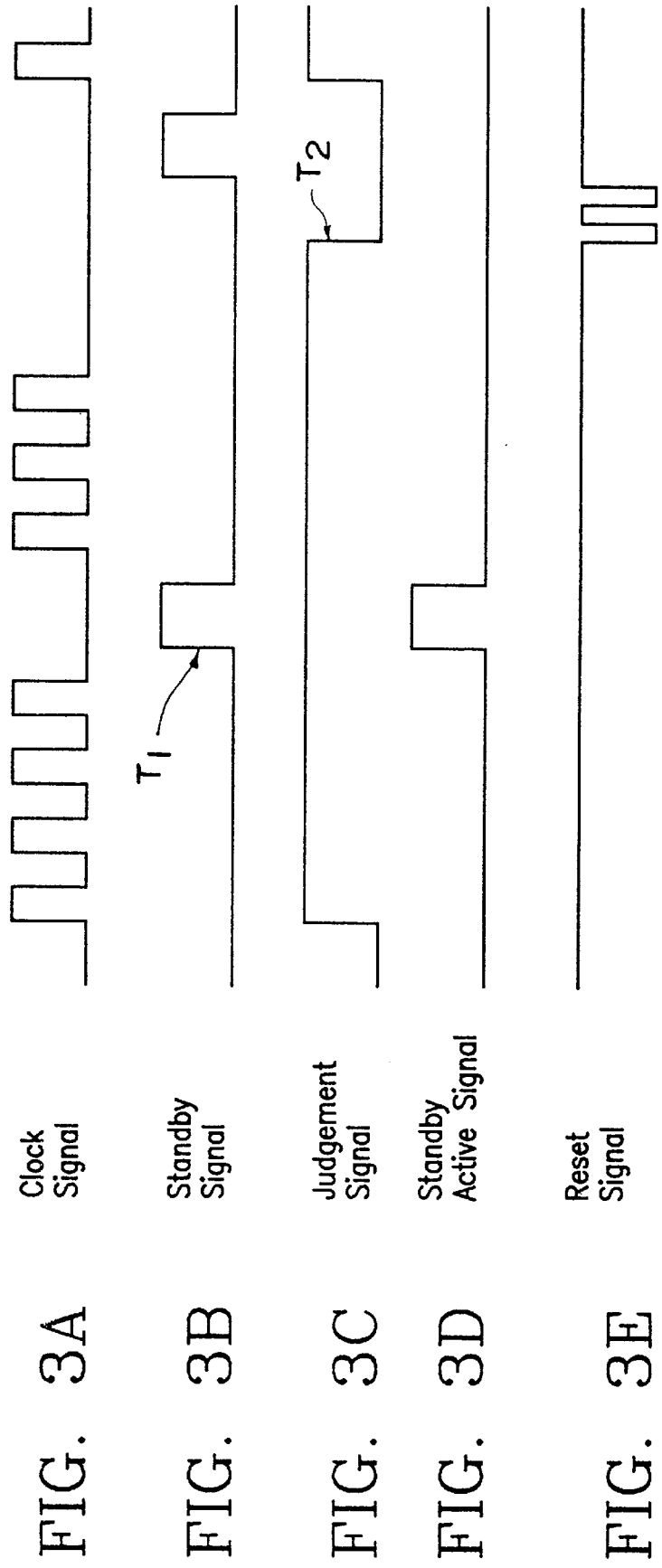

5,982,985

COMPUTER MONITORING UNIT AND POWER WINDOW SYSTEM

BACKGROUND OF THE INVENTION

1. Field of the Invention

This invention relates to a computer monitoring unit and power window system, and more particularly to a computer monitoring unit for monitoring the computer and a power window system equipped with the computer monitoring unit.

2. Related Art

Until now, in the microcomputer (hereinafter called MICON) system operating on the battery, when MICON is not used, MICON is brought into the standby mode and is not allowed to run the program in order to reduce the battery power consumption.

Now, to MICON, a MICON monitoring circuit is connected for monitoring the MICON state based on the state signals from MICON and for restarting MICON if MICON is not in the normal state. On the other hand, as described above, when MICON is brought into the standby mode, no state signal is outputted from MICON to the MICON monitoring circuit. Consequently, MICON which enters the standby mode outputs signals for bringing it into standby mode to the MICON monitoring circuit and brings the MICON monitor circuit into the standby mode and stops the monitoring facility.

However, because the MICON monitoring circuit is controlled by MICON, there is a case in which the standby mode signal is mistakenly inputted from MICON to the MICON monitoring circuit. In this way, the MICON monitoring circuit which has received the standby mode signal from MICON enters the standby state, and is unable to monitor the MICON state, which is the originally assigned function of the MICON monitoring circuit.

SUMMARY OF THE INVENTION

Under the above circumstances, it is an object of this invention to provide a computer monitoring unit which can properly stop the computer state monitoring and a power window system equipped with the computer monitoring unit.

In order to achieve the above object, this invention is equipped with a restarting means for restarting the computer when the first signal for indicating the computer state is not inputted from the computer at each time a predetermined period of time passes, an output means for outputting the second signal for a specified prolonged period from when the first signal is inputted to the restarting means, and a stopping means for stopping the restarting means when the second signal is outputted from the output means and the third signal for instructing to stop the restarting means from the computer simultaneously.

The restarting means according to this invention restarts the computer when the first signal showing the computer state is not inputted. from the computer at each time a predetermined period of time passes. Consequently, the restarting means monitors the computer state. The first signal showing the computer state may be an information signal, but because the computer is able to output clock signals at each time a predetermined period of time passes if the computer is in the normal state, the first signal can be a clock signal. If the first signal showing the computer state is a clock signal, the computer state can be indicated with simple signals, and the load to the computer can be reduced.

The output means outputs the second signal continuing for a specified time from the time when the first signal is inputted to the restarting means.

When the first signal is outputted from the computer at each time a predetermined period of time passes, that is, when the second signal is outputted from the output means, it is possible to judge that the computer is in the normal state. In this case, the third signal instructing to stop from the computer in this event can therefore be judged to be outputted when the computer is in the normal state. On the other hand, when neither second signal from the output means nor third signal from the computer is outputted, for example, when the third signal only is outputted, the computer is judged not to be in the normal state because the second signal is not outputted.

Then, the stopping means stops the restarting means when both the second signal from the output means and the third signal instructing to stop the restarting means from the computer are outputted, because the computer can be judged to be in the normal state. With this configuration, monitoring of the computer state by the restarting means can be properly stopped.

When neither the second signal from the output means nor the third signal from the computer is outputted, the restarting means is not stopped because the computer is unable to be judged to be in the normal state as described above.

In this way, when both the second signal continuing for a specified time from the time when the first signal is inputted and the third signal instructing to stop the restarting means from the computer are outputted, the restarting means is stopped, and therefore, the restarting means can be stopped in response to the third signal outputted when the computer is in the normal state.

This invention is equipped with the first circuit for outputting the signal for restarting the computer to the computer when the first signal is not inputted from the computer at each time a predetermined period of time passes, the second circuit for outputting the second signal continuing for a specified time from the time when the first signal is inputted to the first circuit, and the third circuit for outputting the stop instruction signal to the first circuit when both the second signal from the second circuit and the third signal are outputted. The first circuit, second circuit, and third circuit according to this invention correspond to the restarting means, output means, and stopping means, respectively, according to this invention which have been described previously, and achieve the similar operating effects, and, therefore, the description is omitted.

Now, the first circuit may be configured to further output the fourth signal to the second circuit for restarting the computer, and the second circuit may be configured to input the fourth signal and at the same time to output the second signal continued for a specified time from the time when the fourth signal is inputted.

The first circuit may be configured to output the fifth signal whose cycle is the same as that of the first signal and in synchronism with the input of the first signal to the second circuit, while the second circuit is configured to input the fifth signal and at the same time output the second signal for the specified time from the time when the fifth signal is inputted.

In addition, the third circuit may be configured to be an AND circuit equipped with the first input terminal to which the second circuit is connected and the second signal is inputted, the second input terminal to which the computer is connected and the third signal is inputted, and an output terminal connected to the first circuit and for outputting the stop instruction signal when both the second signal via the first input terminal and the third signal via the second input terminal are inputted.

Now, the computer monitoring unit according to the aforementioned invention is applicable to various systems, but it can form a power window system containing the computer monitoring unit.

The power window system may be designed to be equipped with a control circuit for controlling the motor for raising and lowering the door window and to allow the third circuit to output the stop instruction signal to the control circuit when the second signal from the second circuit and the third signal from the computer for instructing to stop the restarting means are simultaneously outputted.

The power window system may be designed to have a switch which is connected to the computer and the control circuit and at the same time which outputs the signal for instructing the computer and the control circuit to raise and lower the door window, to allow the computer to output the signal corresponding to the instructions provided by the switch as well as allow the control circuit to control the motor in accordance with the signal from the switch for instructing to raise and lower the door window and the signal corresponding to the instructions from the computer provided by the switch.

By the way, as described above, if the third circuit is configured by the AND circuit, the output terminal of the AND circuit may be further connected to the control circuit. Consequently, the control circuit can be stopped by the stop instruction signal from the computer.

BRIEF DESCRIPTION OF THE DRAWINGS

FIG. 3A is a timing chart of clock signals outputted from the watch dog circuit (MICON);

FIG. 3B is a timing chart of standby signals outputted from MICON;

FIG. 3C is a timing chart of judgment signals outputted from the judgment circuit;

FIG. 3D is a timing chart of standby active signals outputted from the AND circuit; and FIG. 3E is a timing chart of reset signals outputted from the watch dog circuit.

EMBODIMENT

Figure 1:
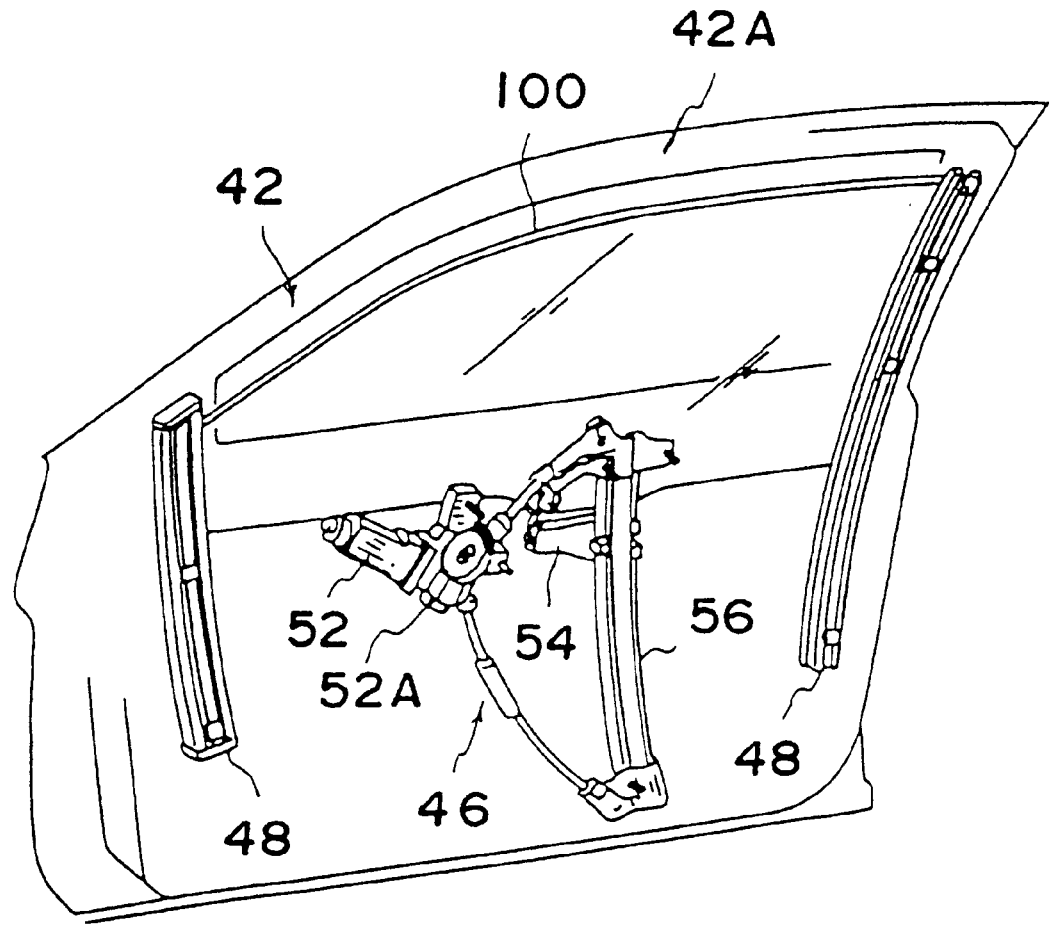
FIG. 1 is a perspective view showing an interior construction of the door on the driver's seat side of the embodiment according to this invention.

Referring now to the drawings, the embodiment according to this invention will be described in detail.

FIG. 1 shows the interior construction of the door on the driver's seat side. As shown in FIG. 1, inside the door on the driver's seat side, a motor 52 is equipped. To the motor 52, a window regulator section 46 is connected. The window regulator section 46 is designed in a so-called wire system in this embodiment, and wire is wound around the rotary plate 52A mounted to the driving shaft of the motor 52. The end portion of this wire is connected to the holding channel 54 supporting the bottom portion of the door glass 100, and further the holding channel 54 is mounted vertically movably to the main guide 56. With this configuration, rotation of the motor 52 in the forward and reverse directions transmits this rotation driving force via wire, and the door glass 100 vertically moves along the glass guide 48. The configuration of the window regulator section 46 shall not be limited to this kind of wire system but may be of an X arm system or a so-called motor self-propelling system in which the motor itself moves along the rack.

When the door glass 100 is raised by the motor 52, the circumferential edge portion of the door glass 100 fits into the rubber weather strip (not illustrated) inside the frame 42A of the door 42 to close the opening of the door frame 42A. When the door glass 100 is moved downward by the rotation driving of the motor 52, the opening of the frame 42A of the door 42 is opened.

Now, description is made on the control system.

Figure 2:
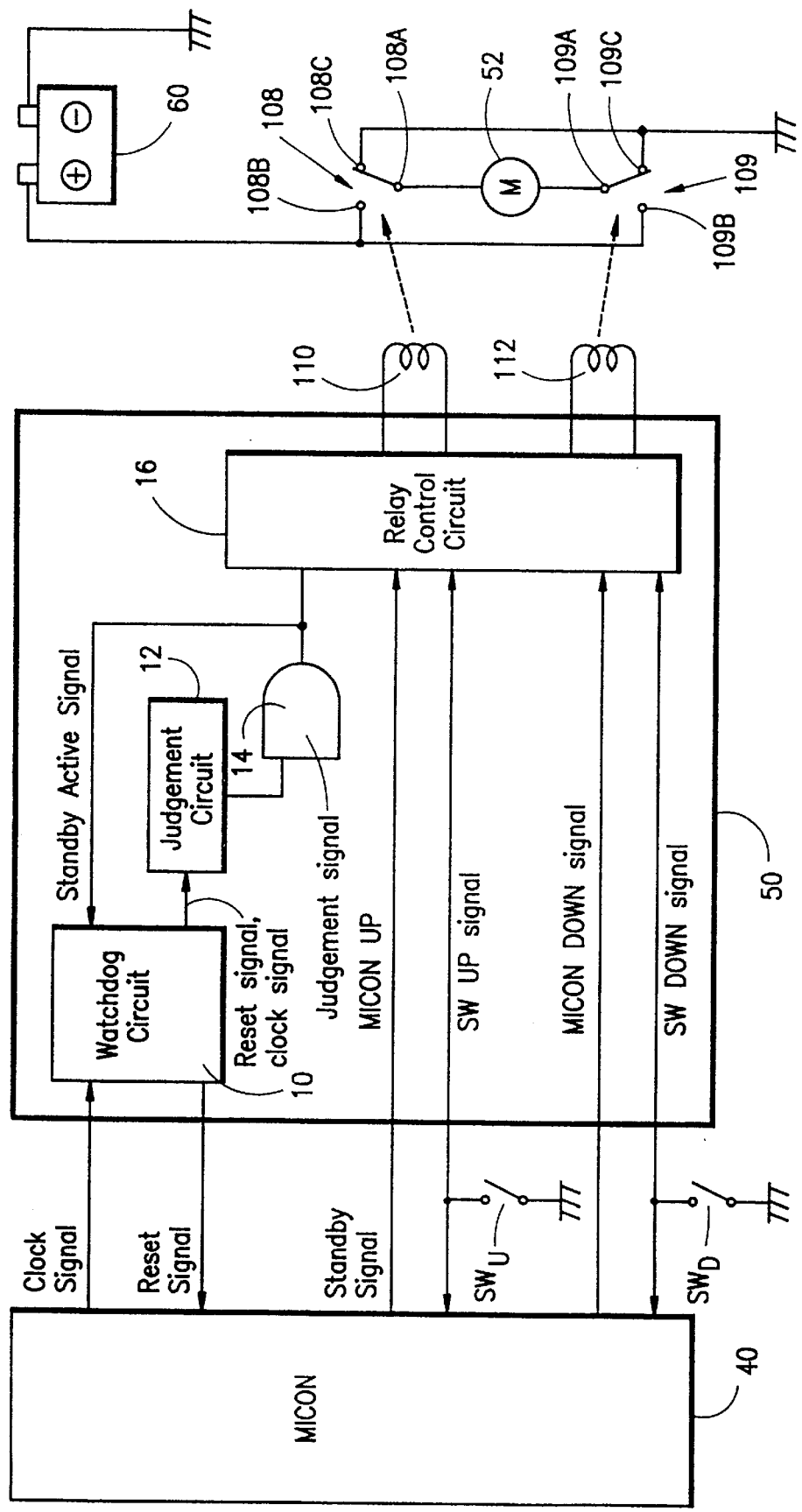
FIG. 2 is a block diagram showing the power window system of the embodiment according to this invention.

The control system, as shown in FIG. 2, is equipped with MICON 40 for outputting clock signals at fixed intervals and a control circuit 50 which includes watchdog circuit (restarting means, first circuit) 10, judgment circuit (output means, second circuit) 12, AND circuit (stopping means, third circuit) 14, and relay control circuit 16. NICON 40 is connected to a watchdog circuit 10 which is inputted clock signals (first signals of the invention) from MICON 40 and which outputs reset signal to MICON 40 to reset MICON 40 when a watchdog circuit 10 is not inputted clock signals from MICON 40 at fixed intervals (see FIG. 3E). Consequently, the watchdog circuit 10 monitors the state of MICON 40.

To the watchdog circuit 10, a judgment circuit 12 is connected. When the clock signal is inputted from MICON 40, the watchdog circuit 10 synchronizes with this clock signal and outputs the clock signal at the same intervals to the judgment circuit 12. If the clock signal is not inputted from MICON 40 at each time a predetermined period of time passes, the watchdog circuit 10 outputs reset signals to the judgment circuit 12.

The judgment circuit 12 is connected to the first input terminal of the AND circuit 14, and the judgment signal (second signal of this invention) is inputted from the judgment circuit 12 to the first input terminal. To the second input terminal of the AND circuit 14, MICON 40 is connected, and the standby signal (third signal of this invention) is inputted from MICON 40 to the second input terminal. The output terminal of the AND circuit 14 is connected to the watchdog circuit 10 and relay control circuit 16, and the standby active signal is inputted to the watchdog circuit 10 and the relay control circuit 16.

To the MICON 40 and the relay control circuit 16, an UP switch $SW_U$ for raising the door glass 100 and a DOWN switch $SW_D$ for lowering the door glass 100 are connected. When the UP switch $SW_U$ and the DOWN switch SWD are turned on, MICON 40 detects this and outputs the MICON UP signal and MICON DOWN signal to the relay control circuit 16 via their associated cables respectively. When the UP switch $SW_U$ and the DOWN switch $SW_D$ are turned on, to the relay control circuit 16, SWUP signal and SWDOWN signal are inputted via the respect cables.

To the relay control circuit 16, the first relay coil 110 and the second relay coil 112 are connected.

At the position corresponding to the first relay coil 110, the first relay switch 108 is located. The common terminal 108A of the first relay switch 108 is connected to one end of the motor 52. The first contact 108B is connected to the positive-side terminal of the battery 60 and the second contact 108C is grounded. When the first relay coil 110 is not excited, the first relay switch 108 is switched to the second contact 108C.

On the other hand, at the position corresponding to the second relay coil 112, the second relay switch 109 is located. The common terminal 109A of the second relay switch 109 is connected to the other end of the motor 52. The first contact 109B is connected to the positive-side terminal of the battery 60 and the second contact 109C is grounded. When the second relay coil 112 is not excited, the second relay switch 109 is switched to the second contact 109C.

Now, when the UP switch $SW_U$ is turned on and the MICON UP signal and SWUP signal are inputted, the relay control circuit 16 excites the first relay coil 110. When the first relay coil 110 is excited, the first relay switch 108 is switched to the first contact 108B, allowing the current to flow from one end to the other end of the motor 52, and the motor 52 rotates forward and the door glass 100 rises (moves to the closing direction). When the DOWN switch $SW_D$ is turned on and the MICON DOWN signal and SWDOWN signal are inputted, the relay control circuit 16 excites the second relay coil 112. When the second relay coil 112 is excited, the second relay switch 109 is switched to the first contact 109B, allowing the current to flow in the opposite direction, and the motor 52 rotates reversely and the door glass 100 lowers (moves to the opening direction).

Now the operation of this embodiment is described.

From MICON 40, the clock signal is outputted at each time a predetermined period of time passes as shown in FIG. 3A. The watchdog circuit 10 to which this clock signal is inputted synchronizes with the clock signal and outputs the clock signal to the judgment circuit 12. The judgment circuit 12 brings the judgment signal to a high level for a specified time (i.e. maintains it to a high level for a specified time) from the time when the clock signal is inputted. Consequently, if the clock signal is kept outputted at each time a predetermined period of time passes, the judgment signal is maintained to a high level as shown in FIG. 3C. However, inputting the reset signal from the watchdog circuit 10 causes the judgment circuit 12 to bring the judgment signal to a low level (causes it to stop outputting judgment signal) as shown in FIG. 3C ($T_2$).

This judgment signal is inputted to one input terminal of AND circuit 14, and under this condition, MICON 40 is normal, and as shown with symbol $T_1$ in FIG. 3B, when the standby signal is outputted from MICON 40, the standby active signal under the high state is outputted from AND circuit 14 to the relay control circuit 16 and the watchdog circuit 10, as shown in FIG. 3D.

As described above, the relay control circuit 16 and the watchdog circuit 10 to which a high-state standby active signal is inputted enter the standby mode. By this configuration, the power consumption is reduced. And the watchdog circuit 10 stops the monitoring facility. Consequently, with the standby signal outputted from MICON 40 under the normal state, the watchdog circuit 10 can stop the monitoring facility.

On the other hand, when the clock signal is not outputted from MICON 40, the reset signal is outputted from the watchdog circuit 10 to the judgment circuit 12 in place of the clock signal. The judgment circuit 12 to which the reset signal is inputted brings the judgment signal to the low level as shown with symbol $T_2$ in FIG. 3C. Under this condition, MICON 40 is not in the normal state, and even if the standby signal C (see FIG. 3C) is outputted from MICON 40, no high-state standby active signal is outputted from the AND circuit 14.

Consequently, if the standby signal is mistakenly outputted from MICON 40 under not normal state, the clock signal is not outputted from MICON 40, and therefore, no high-state standby active signal is outputted from the AND circuit 14. Consequently, the watchdog circuit 10 and relay control circuit does not enter the standby mode. Therefore, the watchdog circuit 10 continues monitoring facility. And it is possible to prevent the monitoring facility from being mistakenly stopped.

In the embodiment described as above, description was made on an example equipped with the UP switch $SW_U$ and the DOWN switch $SW_D$ for raising and lowering the door glass 100 of the driver's seat, but it is understood that this invention is not limited to this embodiment, and the UP switch and the DOWN switch may be equipped to other seat for raising and lowering the door glass of the relevant seat, and also the UP switch and the DOWN switch may be equipped to the driver's seat for raising and lowering the door glass of other seats.

In the embodiment described as above, description was made with the power window system taken for an example, but it is understood that this invention is not limited to this embodiment and may be applied to the MICON monitoring circuit for monitoring the MICON state.

What is claimed is:

1. A computer monitoring unit, wherein said unit comprises
    a restarting means for restarting a computer when a first signal indicating a computer state is not inputted from a computer at each time a predetermined period of time passes,
    an output means for outputting a second signal continued for a specified time from the time when the first signal is inputted to said restarting means, and
    a stopping means for stopping said restarting means when said second signal from said output means and a third signal for instructing to stop from said computer are simultaneously outputted.

2. The computer monitoring unit according to claim 1, wherein said first signal is a clock signal.

3. The power window system according to claim 1, wherein said power window system comprises a control circuit for controlling a motor for raising and lowering a door window and said stopping circuit further stops said control circuit when said second signal from said output circuit and the third signal for instructing said restarting circuit to stop from said computer are both outputted.

4. The power window system according to claim 3, wherein said power window system is equipped with a switch connected to said computer and said control circuit and for outputting a signal for instructing said computer and said control circuit to raise and lower said door window,
    said computer outputs signals corresponding to the instruction contents provided by said switch to said control circuit, and
    said control circuit controls said motor in accordance with the signal from said switch for instructing to raise and lower said door window and the instruction contents provided by said switch from said computer.

5. A power window system having a computer monitoring unit that comprises:
    a first circuit for outputting, to a computer, signals for restarting a computer when a first signal is not inputted from said computer at each time a predetermined period of time passes,
    a second circuit for outputting a second signal continued for a specified time from the time when said first signal is inputted to said first circuit, and a third circuit for outputting a stop instruction signal to said first circuit when said second signal from said second circuit and a third signal for instructing to stop from said computer are simultaneously outputted.

6. The power window system according to claim 5 wherein said first signal is a clock signal.

7. The power window system according to claim 5 wherein said first circuit further outputs a fourth signal to said second circuit for restarting said computer, and said second circuit inputs said fourth signal and stops outputting the second signal when said fourth signal is inputted.

8. The power window system according to claim 5 wherein said third circuit is an AND circuit equipped with a first input terminal to which said second circuit is connected and said second signal is inputted, a second input terminal to which said computer is connected and said third signal is inputted, and an output terminal connected to said first terminal and for outputting said stop instruction signal when said second signal is inputted via said first input terminal and said third signal is inputted via said second input terminal.

9. The power window system equipped with a computer monitoring unit according to claim 5.

10. The power window system according to claim 5, wherein said power window system is equipped with a control circuit for controlling a motor for raising and lowering the door window, and said third circuit further outputs said stop instruction signal to said control circuit when said second signal from said second circuit and the third signal from said computer for instructing to stop said restarting signals are both outputted.

11. The power window system according to claim 7 wherein said first circuit outputs a fifth signal with the same interval as that of the first signal in synchronism with the input of the first signal to said second circuit, and said second circuit inputs said fifth signal and outputs the second signal continued for a specified time from the time when said fifth signal is inputted.

12. The power window system according to claim 9 wherein said first signal is a clock signal.

13. The power window system according to claim 9 wherein said first circuit outputs a fourth signal for restarting said computer to said second circuit, and said second circuit inputs said fourth signal and at the same time stops outputting the second signal when said fourth signal is inputted.

14. The power window system according to claim 9 wherein said third circuit is an AND circuit equipped with a first input terminal to which said second circuit is connected and said second signal is inputted, a second input terminal to which said computer is connected and said third signal is inputted, and an output terminal connected to said first circuit and for outputting said stop instruction signal when said second signal is inputted via said first input terminal and said third signal is inputted via said second input terminal.

15. The power window system according to claim 10 wherein said power window system is equipped with a switch connected to said computer and said control circuit as well as for outputting a signal for instructing said computer and said control circuit to raise and lower said door window, said computer outputs a signal corresponding to instruction contents provided by said switch to said control circuit, and said control circuit controls said motor in accordance with the signal of said switch for instructing to raise and lower said door window and the signal corresponding to the instruction contents provided by said switch from said computer.

16. The power window system according to claim 11 wherein said first circuit further outputs the fourth signal for restarting said computer to said second circuit, and said second circuit inputs said fourth signal and stops outputting the second signal when said fourth signal is inputted.

17. The power window system according to claim 13 wherein said first circuit further outputs a fifth signal at the same interval as that of the first signal to said second circuit in synchronism with the input of the first signal, and said second circuit inputs said fifth signal and outputs the second signal continued for a specified time from the time when said fifth signal is inputted.

18. The power window system according to claim 14 wherein said output terminal is further connected to said control circuit.

19. The power window system according to claim 17 wherein said first circuit outputs the fourth signal for restarting said computer to said second circuit, and said second circuit inputs said fourth signal and stops outputting the second signal when said fourth signal is inputted.

* * * * *